Patented Nov. 21, 1933

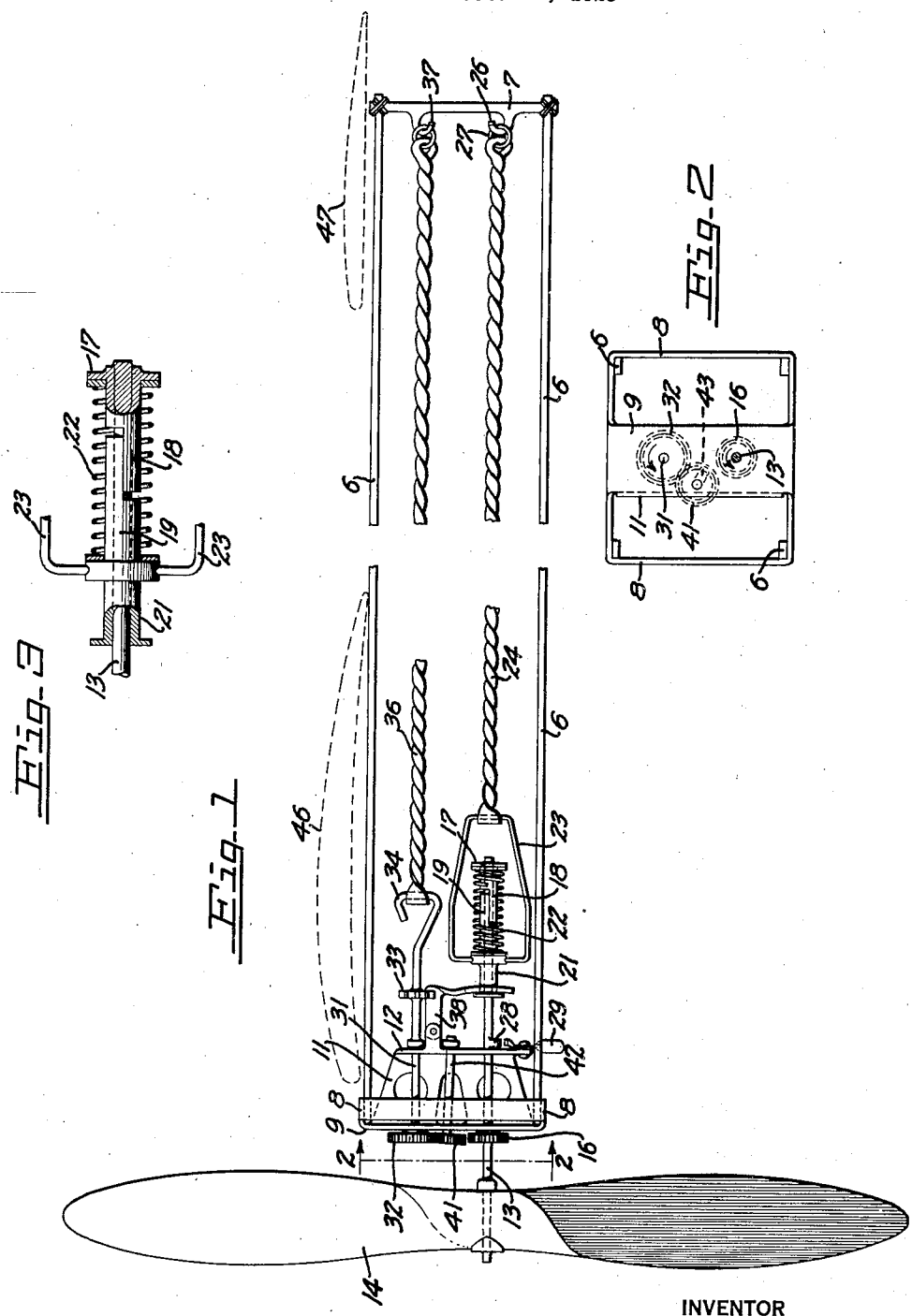

1,936,072

UNITED STATES PATENT OFFICE 1,936,072

SPRING MOTOR

Harry L. Roderick, Oakland, Calif.

Application October 11, 1929. Serial No. 398,905

17 Claims. (Cl. 185—37)

My invention relates to motors for driving toys or other clockwork devices, and particularly to motors for driving model aircraft.

An object of my invention is to provide a motor having a plurality of driving units which come into operation successively to drive the device.

Another object of my invention is to provide a motor of the character described having means operative upon the expenditure of the power stored in one driving unit for disconnecting said unit from its power shaft and for connecting another driving unit to said shaft.

Still another object of my invention is to provide a motor of sufficiently light weight to be applicable to model aircraft, and having a frame which may be used without alteration as a foundation frame or body for such a device.

My invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is an elevation of a preferred form of my invention.

Figure 2 is a cross-sectional view taken on the line 2—2 of Figure 1.

Figure 3 is a detailed view of the clutch mechanism which is shown on a smaller scale in Figure 1.

In broadly descriptive terms, the motor of my invention comprises a frame upon which the main or power shaft of the device is mounted, and which is preferably suitably shaped to act as the frame for the fuselage of a model aeroplane. A resilient driving unit, such as a twisted rubber band, is releasably connected from the frame to the main shaft. A second shaft, also provided with a resilient driving unit, is mounted on the frame and is provided with a stop to hold it against rotation. Means operative in time with the terminal period of operation of the first driving unit, disconnects the unit from the drive shaft and releases the stop; and additional means, operative upon rotation of the second driving unit, connects its shaft for rotation with the main shaft. The two driving units therefore come into operation successively, and the motor will operate over a period of time which is approximately double that of a motor of comparable over-all dimensions having but a single driving unit. It is, of course, obvious that additional driving units may be provided and brought successively into operation by similar means if desired.

The preferred embodiment of my invention illustrated in the drawing comprises a frame formed of strips 6 of bamboo, aluminum, or other suitable light material, and which are secured at one end to a tail post 7 and at the other or front end to a preferably quadrangular fore-frame.

The fore-frame comprises a flange 8 having a cross bar 9 extending vertically across it. A bracket 11 having a lip 12 extends rearwardly from the cross plate, and the shafts of the device are journaled in the cross plate and the lip.

As viewed in the drawing, the lower of these shafts is the main or power shaft 13, which carries on its outer end the propeller or other driven device 14. Mounted rearwardly of the propeller and abutting on the cross plate is a gear wheel 16 which also serves as a thrust collar. The rear end of the main shaft terminates in a flange 17 to which is secured the fixed member 18 of a sliding-jaw or split-cylinder clutch, the engaging surface of which is relatively much longer axially of the shaft than is customary in devices of this type. The other member 19 of the clutch is axially and rotatably movable upon the shaft 13, and is fixed for movement with a flanged drum 21. A compression spring 22 surrounding the two clutch members tends to force them out of engagement.

A loop or yoke 23 is fixed for rotation with the clutch member 19 and extends rearwardly of the shaft, and to it is fastened the driving unit 24 which is preferably a rubber band, but which may, under certain circumstances, be a spiral spring or other resilient drive. Power is stored in the driving unit by twisting it from its rear end, which is then caught over the hook 26 formed on the tail post 7. A ring 27 is preferably provided to facilitate its engagement.

A stop 28 engageable by a trigger 29 is provided on the shaft 13 for preventing rotation during the winding operation or until it is desired to use the power from the motor.

A spring or rubber band of the type described shortens under torsional stress, and the driving unit 24 therefore serves to hold the two halves of the clutch in engagement against the action of the spring 22, so that the shaft will be rotated by the driving unit when the trigger 29 is released from the stop.

Journaled in the fore-frame parallel with the shaft 13 is a second shaft 31 which carries a gear 32 at its forward end. This shaft carries a ratchet or stop wheel 33, and terminates in a hook 34 which engages the second resilient driving unit 36, the rear end of this unit being attached to a second hook 37 on the tail post 7 in the same manner as the unit 24.

A bent lever 38 is pivoted to the lip 12 and engages with the stop wheel 33. The outer end of this lever is forked and encircles the drum 21, so that it will be thrown out of engagement with the stop wheel by the expansion of the spring 22 when the latter is released by the untwisting of the drive unit 24.

Interposed between the gears 16 and 32 is an idler pinion 41, mounted on a shaft 42 whose rear end is journaled in a circular hole in lip 12; but whose forward end is movable in a slot 43 in the cross plate 9. As a result of this method of mounting, if the gear 32 is locked and the gear 16 rotates in the direction shown by the arrow, the pinion 41 will be forced out of mesh with the gear 16, and the shaft 13 will therefore be free to turn. If, however, the gear 32 turns in the direction shown by its arrow, shaft 42 will roll in the slot 43 into mesh with the gear 16, and the shaft 13 will therefore be driven by the shaft 31. This action is assisted by gravity when the motor is mounted in the position shown, but it will take place even though the motor be inverted.

Airfoils may be readily attached to the motor frame as indicated by the dotted lines 46 and 47, thus forming a model airplane with the motor frame as the fuselage. When it is desired to fly such a plane, the trigger 29 is engaged to the stop 28, the ring 27 is unhooked, the driving unit 24 is tensioned to engage the clutch, and the unit is wound, preferably by means of a hand drill or some similar device. The lever 38 is then engaged with stop 33 and the unit 36 similarly wound. Upon the release of the trigger 29 the unit 24 drives the propeller shaft until it is sufficiently lax for the clutch to disengage. When this occurs, the spring 22 forces the flange of the drum 21 against the yoke end of the lever 38 and releases the stop 33, thus permitting the shaft 31 to rotate and assume the drive of the shaft 13 through the engagement of gears 41 and 16.

Since the two drive units come into operation successively, the time of operation of the device is substantially double that obtainable from a single driving unit. The extension of flying distance is usually more than double, since the plane has acquired full speed by the time the second unit comes into operation and it is not required to give an initial acceleration to the plane. A model plane, driven by the motor described, and having a wing spread of 38 inches, has flown to a height of three hundred feet and covered a distance of a mile and a half before the energy stored in the drive unit was exhausted.

I claim:

1. A motor for converting potential energy to kinetic energy comprising a main shaft, a second shaft, resilient means for turning said main shaft, resilient means for turning said second shaft, a stop for controlling rotation of said second shaft, means for moving said stop in time with the terminal period of operation of the main shaft driving means, and means operating in time with the rotation of the second shaft for connecting the shafts for rotation.

2. A motor for converting potential energy to kinetic energy comprising a main shaft, a second shaft, resilient means lengthening with release of stress for driving said main shaft, resilient means for driving said second shaft, a clutch connecting said main shaft with its driving means and releasable by the lengthening thereof, a stop for controlling the rotation of said second shaft, means operative in time with the release of said clutch for moving said stop, and means operating in time with the rotation of the second shaft for connecting the shafts for rotation.

3. A motor for converting potential energy to kinetic energy, comprising a plurality of rotary driving units, a driven shaft, means for operatively engaging said units successively with said shaft, means for locking one of said units against release of energy, and means operative upon release of stress on another unit for releasing said locking means.

4. A motor for converting potential energy to kinetic energy, comprising a plurality of driving units, a driven shaft, a clutch for connecting one of said units to said shaft and adapted to be held in engagement by stress on said unit, means for locking another of said units, means for operatively engaging said second unit with said shaft, and means operative upon release of stress on said first unit for unlocking said second unit.

5. A motor for converting potential energy to kinetic energy, comprising a plurality of driving units, a driven shaft, a clutch for connecting one of said units to said shaft and adapted to be held in engagement by stress on said unit, means for locking another of said units, a gear driven by said second unit and movable to engage and disengage with said driven shaft, and means operative upon release of stress on said first unit for unlocking said second unit.

6. A motor for converting potential energy to kinetic energy, comprising a plurality of driving units, a driven shaft, a gear on said driven shaft, releasable means for connecting one of said units to said driven shaft, a driving gear rotatable by another of said units, means for locking said driving gear against rotation, means for releasing said locking means to permit rotation of said driving gear, and a pinion meshed with said driving gear and transversely movable by rotation thereof to engage said driven shaft gear.

7. In a motor for converting potential energy to kinetic energy, a driven shaft, resilient means for driving said shaft and changing in length with the potential energy stored therein, a clutch member secured to said shaft, a second clutch member connected to said driving means and axially and rotatably mounted on said shaft and movable into engagement with said first member by the change of length of said driving means accompanying the storage of energy therein, and a spring for disengaging said clutch members.

8. In a motor for converting potential energy to kinetic energy, a driven shaft, a clutch member fixed to said shaft, a second clutch member axially and rotatably movable upon said shaft, resilient driving means connected to said second clutch member and adapted to exert torsional and axial stress thereon, and a spring positioned to disengage said clutch members and to oppose the axial stress exerted by said driving means.

9. A motor for model aircraft comprising a frame, a propeller shaft mounted on said frame, a clutch having a sliding member mounted on said propeller shaft, a resilient driving unit connected to said sliding member and stretched to said frame to slide said member into engagement when stressed, a spring positioned to disengage said sliding member, a second resilient driving unit, means releasable by movement of said sliding member for holding said second unit against rotation, and means actuated by rotation of said second unit for operatively connecting it with said propeller shaft.

10. In combination, a driven shaft having a gear thereon, a driving shaft, a gear on said driving shaft, an idler shaft mounted for rotary movement and angular movement transverse to its axis of rotation, and a pinion on said idler shaft meshed with said driving shaft gear and movable by rotation thereof into mesh with the driven shaft gear.

11. In combination, a driven shaft having a gear thereon, a driving shaft, a gear on said driving shaft, an idler shaft, a bearing for rotatably mounting one end of said idler shaft, a bearing for rotatably and slidably mounting the other end of said idler shaft, and a pinion on the slidably mounted end of the idler shaft and meshed with said driving gear and movable into mesh with said driven shaft gear by rotation of the driving gear.

12. A motor for converting potential energy to kinetic energy, comprising a plurality of driving units, a driven shaft, transmission mechanism for connecting one of said units to said shaft adapted to be held in engagement by stress on said unit, means for locking another of said units, means for operatively engaging said second unit with said shaft, and means responsive to release of stress on said first unit for disengaging said transmission mechanism, and unlocking and engaging said second unit with said shaft.

13. In a motor, a driven shaft, separate elastic motive elements comprising one element adapted to exert a relatively strong torque and another adapted to exert a weaker torque for a longer period, and means controlled by stresses in said one element for driving said shaft from said elements in succession, said one element acting first.

14. A device of the character described comprising an element to be operated, a shaft supporting said element, a plurality of actuators, mechanism for operating said element by one of said actuators while another of said actuators remains idle, and means supported by said shaft preventing operation of said other actuator until after said first actuator has operated to a predetermined condition.

15. A device of the character described comprising an element to be operated, a plurality of actuators, a device on said element preventing operation of another actuator until one actuator has operated to a predetermined condition, and a spring on said element for shifting said device to position to permit operation of another actuator after said first actuator has operated to a predetermined condition.

16. A device of the character described comprising a rotary shaft, an actuator for rotating said shaft, an additional actuator, gearing for rotating said shaft by said additional actuator, and means supported by said shaft for preventing operation of said shaft by said additional actuator until said first actuator has rotated said shaft for a desired length of time.

17. In a motor, a driven shaft, driving means therefor comprising an element engaging said shaft, supplemental driving means for said shaft, and means controlled by movement of said element with respect to said shaft for disabling said supplemental driving means.

HARRY L. RODERICK.